March 11, 1947.  J. C. McCUNE  2,417,209
BRAKE CONTROL APPARATUS
Filed March 23, 1945  2 Sheets-Sheet 2
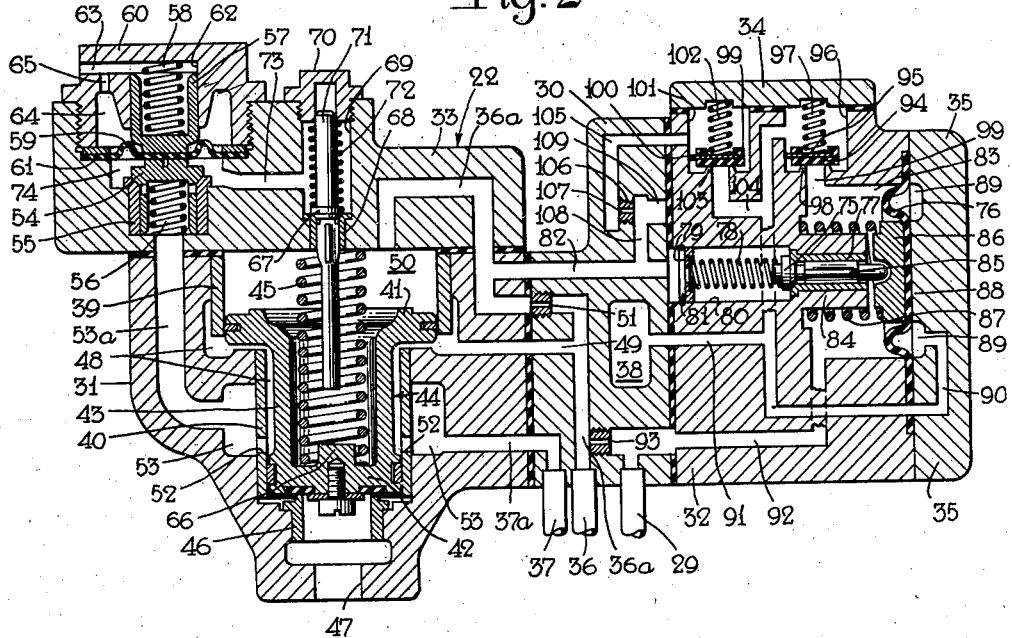
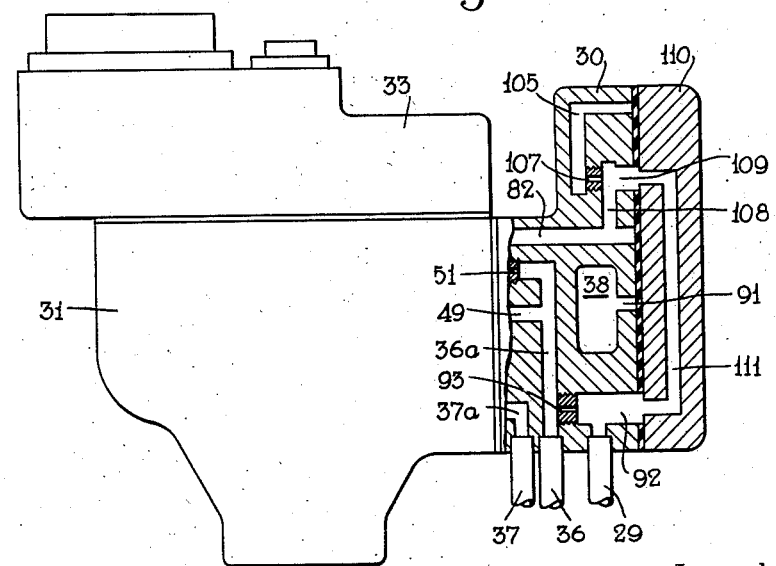
INVENTOR.
Joseph C. McCune
BY
ATTORNEY Patented Mar. 11, 1947

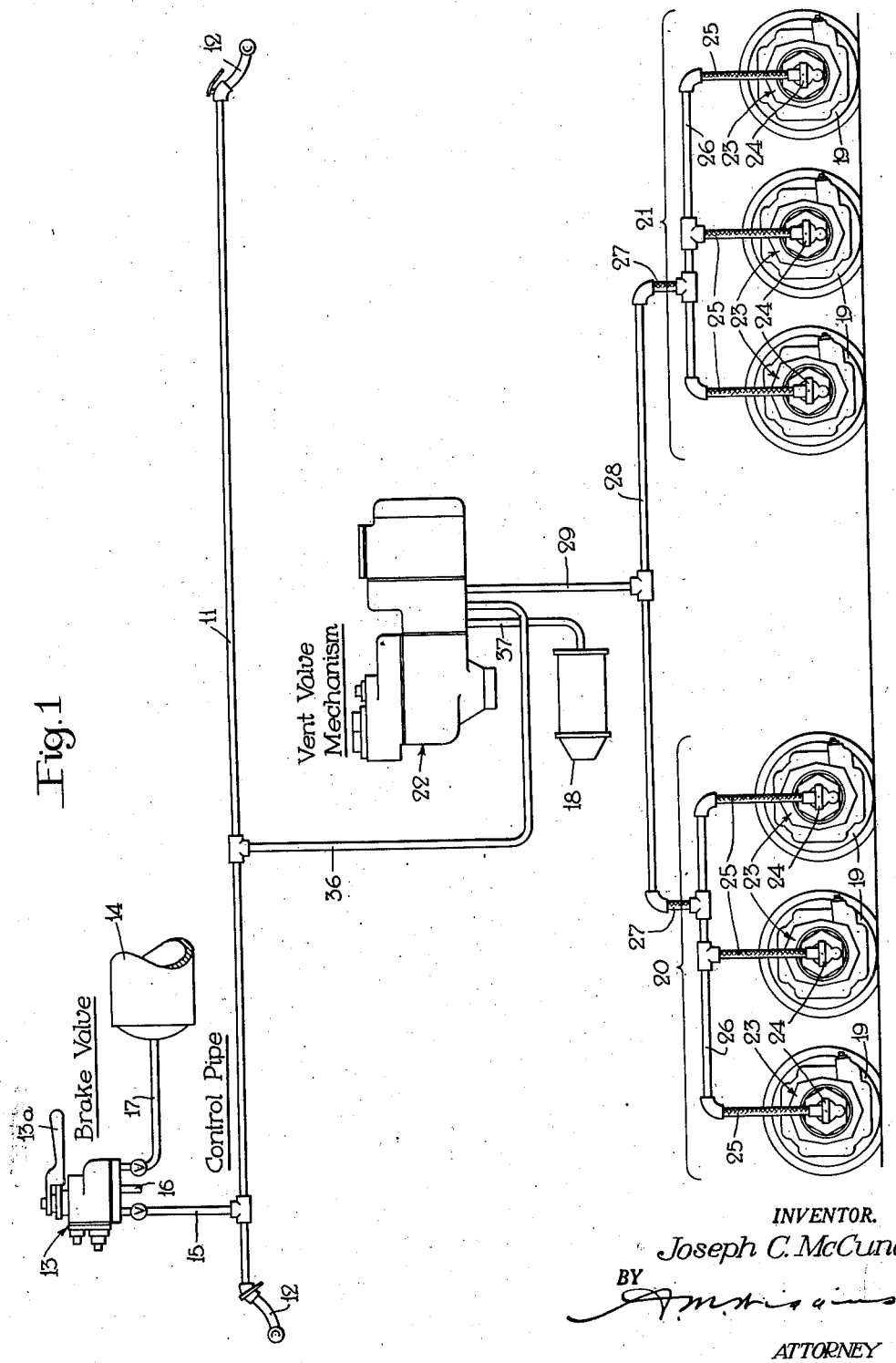

2,417,209

UNITED STATES PATENT OFFICE 2,417,209

BRAKE CONTROL APPARATUS

Joseph C. McCune, Edgewood, Pa., assignor to The Westinghouse Air Brake Company, Wilmerding, Pa., a corporation of Pennsylvania Application March 23, 1945, Serial No. 584,352

18 Claims. (Cl. 303—21)

This invention relates to brake control apparatus and has particular relation to brake control apparatus for vehicles, such as railway cars and trains, including mechanism controlled responsively to the occurrence of a slipping condition of the vehicle wheels due to braking for effecting a reduction in the degree of application of the brakes and a subsequent increase in the degree of application of the brakes in a manner to prevent the sliding of the vehicle wheels.

As employed in the present application, the terms "slipping" or "slipping condition" and similar variants and the term "sliding" or "sliding condition" and similar variants are not synonymous. The term "slipping" and its variants, as employed herein, refers to the rotation of a vehicle wheel at a speed different from that corresponding to the speed of the vehicle at a given instant. When a slipping condition is induced due to excessive braking with relation to the adhesion between the wheel and the rail or road surface, the wheel rotates at a speed less than that corresponding to vehicle speed at a given instant. When the slipping condition is induced in response to excessive propulsion torque with relation to the adhesion between the wheel and the rail or road surface, the instantaneous speed of rotation of the wheel exceeds that corresponding to the speed of the vehicle. In the present application only a slipping condition of vehicle wheels induced by excessive braking forces will be considered.

When a wheel begins to slip due to excessive braking forces, the wheel decelerates at an abnormally rapid rate toward a zero speed or locked condition. In the present application, the term "sliding" and its variants refers to the dragging of a vehicle wheel along a road surface or rail in a locked or non-rotative condition.

Various devices and mechanisms of a mechanical or an electrical nature have been proposed and employed for the purpose of recognizing the slipping condition of a vehicle wheel on the basis of deceleration of the vehicle wheel at an abnormally high rate which does not occur unless the wheel is actually slipping.

For example, in the copending joint application, Serial No. 533,284, of Joseph C. McCune, the present applicant, and George K. Newell, filed April 29, 1944, and assigned to the assignee of the present application, a wheel slip detecting device of the so-called rotary inertia type is disclosed. This wheel slip detecting device is referred to as a "Decelostat." It comprises essentially a fly-wheel rotatably mounted in a housing attached to the end of an axle journal casing in place of the usual end cover and driven through a yielding connection by rotation of the wheel axle. When the vehicle wheel accelerates or decelerates, the fly-wheel rotatively lags or leads the axle in proportion to the rate of acceleration or deceleration. If the wheel decelerates at a slipping rate, that is a rate which occurs only when the wheel slips, the relative rotational movement of the fly-wheel with respect to the axle causes operation of a control device in the form of a pilot valve.

In order to effect prompt reduction of the pressure in a brake cylinder and thereby effect the corresponding prompt reduction in the degree of application of the brakes associated with the slipping wheel or wheels, various types of vent valve mechanisms have been proposed and employed which are actuatively controlled in response to operation of the "Decelostat."

In most instances, a vent valve mechanism is provided for each wheel truck of a railway car and is operative to control the fluid pressure in a single brake cylinder operating the brakes on that truck. The vent valve mechanism is pneumatically controlled by the "Decelostats" associated with each wheel and axle unit of the corresponding truck through a connecting pipe or pipes.

In some instances, however, where a single brake cylinder, mounted on the car body, operates the brake mechanism associated with the wheels of both wheel trucks at opposite ends of the car, a problem is created in providing a suitable pneumatic control of the vent valve mechanism controlling the brake cylinder in response to the operation of the "Decelostats" associated with any of the wheel units of the two wheel trucks for that car. This problem has to do with the sluggish or delayed operation of the vent valve in response to operation of any of the "Decelostats" due to the volume in the pipes connecting the several "Decelostats" to the vent valve mechanism.

It will be appreciated that unless the pressure in the brake cylinder is promptly and rapidly reduced in response to the occurrence of a wheel slip condition, the wheel will decelerate in a relatively short interval of time, of the order of one to two seconds, to a locked condition and slide. It is essential, therefore, that a suitable arrangement be provided for insuring the prompt operation of a vent valve mechanism in response to the occurrence of a slipping condition of the wheels on a railway car equipped with a single brake cylinder controlling all the brakes on the car.

It is an object of my invention, therefore, to provide brake control apparatus, of the general character described, including a novel vent valve mechanism for insuring the prompt and rapid reduction of the pressure in the brake cylinder controlling the brakes associated with all wheels of a car in response to the slipping condition of any of the wheels or wheel units of the car.

As previously indicated, the "Decelostat" of the type disclosed in the above-mentioned application, Serial No. 533,284, includes a pilot valve device which is operative in response to a slipping condition of a vehicle wheel. Such pilot valve device is operative through a pneumatic connection to cause operation of the vent valve mechanism which in turn controls brake cylinder pressure. Heretofore known vent valve mechanisms controlled by the "Decelostat" have proven successful in operation so long as the pneumatic connection between the "Decelostat" and vent valve mechanism is not disrupted or broken accidentally, as by striking an object along the right of way, while the brakes are applied.

In the case of heretofore known vent valve mechanisms employed for controlling brake cylinder pressure in response to the occurrence of a wheel slip condition under the control of the "Decelostat," the accidental breakage of the so-called pilot valve pipe connecting the vent valve mechanism to the "Decelostat" while the brakes are released will not interfere with the subsequent supply of fluid under pressure to the brake cylinder when an application of the brakes is effected but operation of the vent valve mechanism to protect against the sliding of the wheels will be prevented. If the pilot valve pipe is disrupted or broken during an application of the brakes, heretofore known vent valve mechanisms will be operated in a manner to completely release the brakes on the wheels controlled thereby and continue to maintain them released for the remainder of the application during which the pipe is broken.

If only one pilot valve pipe on a train were broken at one time, the most that could possibly happen would be a theoretical lengthening of the stopping distance of the train to the lack of braking force exerted on the affected wheels. If, however, a number of pilot valve pipes should break or be broken during the same application of the brakes, the total diminution in the braking force on the train might have serious consequences.

While such consequences are a remote contingency, it is nevertheless desirable to guard against such contingency and to provide a suitable vent valve mechanism which will be operative to insure reapplication of the brakes on wheels following the reduction in the degree of brake application effected thereby in response to breaking disruption of the pilot valve pipe.

It is accordingly a further object of my present invention to provide brake control apparatus, including a vent valve mechanism of the pneumatically controlled type, which is automatically operative to insure the resupply of fluid under pressure to the brake cylinder and the consequent reapplication of the brakes associated with the wheels of a wheel truck following operation of the vent valve mechanism to reduce the brake cylinder pressure and the degree of application of the brakes in response to breakage of the pilot valve pipe to which the vent valve mechanism is connected.

The above objects, as well as other objects of my invention which will be made apparent hereinafter, are attained by means of brake control apparatus subsequently to be described and shown in the accompanying drawings wherein Figure 1 is a simplified diagrammatic view of a brake control apparatus, including a novel vent valve mechanism, embodying my invention, Figure 2 is an enlarged sectional view, diagrammatically representing the detailed parts of the vent valve mechanism shown in Figure 1 in a single plane for visualization purposes only, and Figure 3 is an elevational view, partly in section, showing a modification of the vent valve mechanism of Figure 2 wherein a cover plate is substituted for a portion of the casing shown in Figure 2 to eliminate some of the functions provided by the vent valve mechanism of Figure 2.

Description

While my invention is intended for use in connection with the conventional and standard fluid pressure brake control apparatus employed today on railway cars on trains, it is deemed unnecessary for purposes of my present invention to become involved in detailed description of such complete fluid pressure brake control equipment. As a matter of expediency, therefore, I have shown in Fig. 1 a diagrammatic and simplified form of fluid pressure brake control apparatus of the so-called straight-air type comprising a control pipe 11 extending longitudinally from end to end of a single car and comprising sections on successive cars connected through suitable and conventional hose couplings 12. Control pipe 11 is normally at atmospheric pressure and is charged to a pressure corresponding to the desired degree of application of the brakes by suitable apparatus under the control of the engineer on the locomotive or power car of the train.

For the purpose of representing conventional apparatus operative by the engineer for the purpose of controlling the pressure in the control pipe 11, I have shown a brake valve 13 of the well-known self-lapping type, together with an associated reservoir 14 which is charged to a certain normal pressure as by a fluid compressor not shown. With the brake valve handle 13a in its normal or brake release position, fluid under pressure is exhausted from the control pipe 11 under the control of the brake valve 13 by way of a branch pipe 15 and an exhaust port and pipe 16.

When the brake valve handle 13a is shifted out of its brake release position into the application zone thereof, the brake valve 13 is operative to close the exhaust communication for the control pipe 11 just described and to establish a supply communication from a reservoir 17 to the branch pipe 15, whereby to cause fluid under pressure to be supplied from the reservoir 14 to the control pipe 11. The self-lapping valve mechanism of the brake valve 13 is of such nature that the pressure established in the control pipe 11 is automatically limited or determined according to the degree of displacement of the brake valve handle out of its brake release position or into its application zone. Moreover, the self-lapping valve mechanism of the brake valve 13 is characterized by a pressure-maintaining feature which causes the brake valve to operate automatically to maintain a pressure in the control pipe 11 corresponding to the position of the brake valve handle, in the event of a tendency of the pressure in the control pipe 11 to reduce for any reason, such as leakage.

The fluid pressure brake control apparatus shown in Figure 1 further includes a single brake cylinder 18 for the entire car operative, upon the supply of fluid under pressure thereto, through the medium of the usual brake rigging or levers to cause application of the brakes on all the wheels 19 of the two wheel trucks 20 and 21 shown.

The wheel trucks 20 and 21 are shown as of the six-wheel or three-axle type, each axle or wheel unit comprising a pair of wheels fixed at opposite ends of a connecting axle.

According to my present invention, a vent valve mechanism 22 is provided on the car body for controlling communication between the control pipe 11 and the brake cylinder 18 through which fluid under pressure may be supplied to the brake cylinder and operative to cut off communication between the control pipe and the brake cylinder and establish an exhaust communication through which fluid under pressure is vented at a rapid rate from the brake cylinder.

The vent valve mechanism 22 is operatively controlled or piloted by a plurality of wheel slip detecting devices or "Decelostats" 23, one of which is associated individually with each wheel and axle unit of the particular car equipment shown.

Since reference may be had to the previously mentioned copending application Serial No. 533,284 for a detailed description of the "Decelostats" 23 it is deemed unnecessary to enlarge greatly upon what has already been said in connection therewith. Briefly, however, the "Decelostats" 23 comprise a fly-wheel rotarily mounted in a casing attached to the end of the axle journal casing in place of the usual end cover, and a yielding drive connection between the fly-wheel and the end of the axle. Upon deceleration or acceleration of the corresponding wheel 19 at a slipping rate, that is a rate which occurs only when the wheel slips, corresponding relative rotary movement of the fly-wheel with respect to the axle and wheels fixed thereto causes operation of a pilot valve device 24 embodied in a suitable casing part removably attached to the "Decelostat" casing. The pilot valve device 24 is essentially a normally seated valve which is effective, upon operation to an unseated position, to establish communication therepast through which fluid under pressure may be exhausted to atmosphere at a rapid rate.

Each of the pilot valve devices 24 is effective individually to operatively control or pilot the operation of the vent valve mechanism 22 through a pneumatic or fluid pressure communication established between the pilot valve devices 24 and the vent valve mechanism 22.

In view of the relative movement between sprung and unsprung parts of a wheel truck as well as between the trucks and car body, certain of the fluid pressure conduits or pipes must necessarily be flexible in character. Thus, each of the pilot valve devices 24 may be connected by a flexible conduit or pipe 25 to a rigid pipe 26 carried by a "sprung," that is spring-supported, part of the truck frame, each of the pipes 26 being, in turn, connected through flexible pipes or conduits 27 to a rigid pipe 28 carried on the body of the car, the vent valve mechanism being connected to pipe 28 as by a pipe 29.

The vent valve mechanism 22, which I provide according to my invention, is an improvement over heretofore known vent valve mechanisms employed for a similar purpose such as that disclosed and claimed in my prior Patent 2,366,044. As a matter of fact, a portion of the vent valve mechanism 22 is substantially identical in construction and operation to that disclosed in the said Patent 2,366,044 as will be pointed out hereinafter.

The vent valve mechanism 22 comprises a sectionalized casing comprising a pipe bracket and mounting section 30, to the opposite faces of which are attached, as by screws (not shown) and intervening sealing gaskets, a vent valve section 31 and an auxiliary valve section 32. The casing of the vent valve mechanism 22 further comprises a cap section 33 removably attached to the vent valve casing section 31 as by screws or bolts (not shown) and an intervening sealing gasket, and also two cover plates or sections 34 and 35 respectively attached as by suitable screws or bolts (not shown) and intervening sealing gaskets to different faces of the auxiliary casing section 32.

Considering the parts of the vent valve mechanism 22 in greater detail, the pipe bracket section 30 is provided with three separate ports to which three pipes are connected, one of the pipes being the pipe 29, the other two pipes being designated by the reference numerals 36 and 37 respectively. The pipe 36 leads to and is connected to the control pipe 11. The pipe 37 leads to the pressure chamber of the brake cylinder 18 and is hereinafter designated the brake cylinder pipe. The pipe 29 may hereinafter be referred to as the pilot valve pipe.

Formed in the pipe bracket section 30 are various passages and ports having connections to and relation with the pipes 29, 36, and 37 as hereinafter described. Also formed in the pipe bracket section 30 is a volume chamber 38, the purpose of which will be described presently.

The vent valve section 31 and its cap section 33 embody valve mechanism substantially identical to that disclosed in my prior Patent 2,366,044, previously referred to, and such mechanism is therefore not claimed herein, per se, as my invention.

The vent valve casing section 31 has two coaxially related bores in which bushings 39 and 40 are respectively secured as by a press fit. An annular piston 41 and a disc type piston valve 42 operate in the bushings 39 and 40 respectively. The annular piston 41 and the piston valve 42 are joined by a tubular stem 43 and together constitute a differential piston valve device 44.

A coil spring 45 extends through stem 43 in interposed relation between the contact face of the cap section 33 and the inner face of the piston valve 42, and yieldingly urges the differential piston valve device 44 downwardly to a position in which the piston valve 42 seats on a seat rib formed on a seat bushing 46, that is secured in a bore constituting a vent port 47 in substantial coaxial relation in the bushings 39 and 40.

The annular chamber 48 formed in surrounding relation to the tubular stem 43 and open to the inner face of the annular piston 41 is connected by a branch passage 49 to a passage 38a to which the pipe 36 is connected.

The chamber 50, formed within the bushing 39 on the outer face of the annular piston 41, is connected by the passage 36a to the pipe 36, a choke-fitting 51 having a restricted orifice therein being interposed in the passage 36a between the branch passage 49 and the chamber 50 for a purpose presently explained. The choke-fitting 51 may be conveniently installed and removed in the passage 36a as by screwing it into the opening of the passage 36a at the contact face of the pipe bracket casing section 30 with the vent valve casing section 31 before the casing sections are assembled.

The bushing 40 has a plurality of ports 52 in spaced peripheral relation therein providing communication between the annular chamber 48 and an annular chamber 53. A passage 37a to which the brake cylinder pipe 37 is connected opens into chamber 53. A passage 53a leads from chamber 53 to the inner seated area of a valve 54 of the poppet type hereinafter referred to as the reduction control valve. The reduction control valve 54 is adapted to seat on a cooperating valve seat formed at the end of a seat bushing 55 suitably secured, as by a press fit, in a bore formed in the cap section 33, the valve 54 having a suitable perforated tubular stem guided within the seat bushing 55. A coil spring 56 contained within the tubular stem of the valve 54 reacts with the casing section 33 in a manner tending to urge the valve 54 to an unseated position.

The reduction control valve 54 is maintained normally seated on the valve seat bushing 55 by a piston type follower 57 having a coil spring 58 acting thereon in a direction to urge the valve 54 to seated position in opposition to the force of the spring 56.

The follower 57 does not directly engage the valve 54 but exerts a force thereon through the medium of an interposed imperforate flexible diaphragm 59. The diaphragm 59 is secured in the cap section 33, as by a screw plug 60 that is screwed into a threaded bore through which the diaphragm is inserted, the screw plug 60 serving to clamp the periphery of the diaphragm between the end of the plug and a shoulder 61 formed in the cap section 33. The follower 57 is guided in a suitable bore 62 formed in the screw plug 60 and open at the inner end thereof to atmosphere through a port 63 for the purpose of preventing dash-pot action of the piston follower 57. Also formed in the screw plug 60 is an annular chamber 64 open to the upper face of the diaphragm 59, the chamber 64 being connected through a port 65 with the atmospheric port 63 and therefore constantly at atmospheric pressure.

As will be explained more fully hereinafter, the differential piston valve device 44 is shiftable, in response to a rapid reduction of the pressure of the fluid in the chamber 50, to a position in which the annular piston 41 engages the contact face of the cap section 33. In this position, piston valve 42 is above the ports 52 in the bushing 40, thereby cutting off the communication between the passage 49 and the passage 37a through which fluid under pressure may be supplied from the control pipe 11 to the brake cylinder 18. At the same time, the unseating of the piston valve 42 from seat bushing 46 connects passage 37a, and therefore the brake cylinder 18, to atmosphere through the exhaust port 47. Thus fluid pressure that has been established in the brake cylinder 18 is rapidly reduced when the differential piston valve device 44 is shifted to its upper position as just described.

In the upper position of the differential piston valve device 44, a boss 66 formed on the inner face of the piston valve 42 engages the end of the stem of a poppet valve 67 which has normal seating engagement with a seat bushing 68 carried in the cap section 33. The seat bushing 68 and the valve 67 are installed and removed through a bore 69 open to the exterior face of the cap section 33, and a screw plug 70 is provided for closing the open end of the bore 69 after insertion of the bushing and valve. The valve 67 has a loose-fitting cylindrical stem 71 on the upper side thereof which is guided in a suitable bore formed in the screw plug 70. A coil spring 72 interposed between the inner end of the screw plug 70 and the valve 67 in surrounding relation to the stem 71 normally urges the valve 67 into seated position on seat bushing 68.

The bore 69 is connected through a passage 73 to the chamber 74 formed at the lower face of the diaphragm 59 associated with the control valve 54.

The reduction control valve 54 and the poppet valve 67 cooperate in a manner hereinafter to be explained to establish a communication through which the pressure in the control chamber 50 of the piston valve device 44 is reduced in accordance with the reduction of the pressure in the brake cylinder to a predetermined low pressure when the piston valve device 44 is once operated to its upper position before the piston valve device 44 is permitted to be restored to its lower position cutting off the exhaust communication through which fluid under pressure in the brake cylinder is being vented to atmosphere.

The auxiliary valve casing section embodies valve mechanism responsive to reduction of the pressure in the pilot valve pipe 29 for insuring a sufficiently rapid reduction of the pressure of the fluid in the chamber 50 above the annular piston 41 of the piston valve device 44 to cause positive and prompt shifting thereof to its upper position engaging the inner or contact face of the cap section 33. This apparatus comprises a valve device in the form of a poppet valve 75 and fluid pressure operated means, in the form of an imperforate flexible diaphragm 76, responsive to a predetermined reduction of the pressure in the pilot valve pipe 29 to effect unseating of the valve 75.

The valve 75 seats on a seat bushing 77 under the yielding force of a coil spring 78 that is interposed between the valve 75 and a collar 79 retained in a bore 80 as by a snap ring 81. The bore 80 is connected by a passage 82 to the passage 36a at a point between the choke-fitting 51 and the chamber 50.

The diaphragm 76 is secured in clamped relation along the periphery thereof between the casing section 32 and the cover section 35 in such a manner as to close the open end of a bore or chamber 83 surrounding a tubular boss 84 out of which a fluted stem of the poppet valve 75 projects. Interposed between the rounded end of the stem 85 of the valve 75 and the diaphragm 76 is a follower 86 having a rounded recess in which the end of the stem 85 is received.

A coil spring 87 is interposed between an annular shoulder on the follower 86 and the base of the chamber or bore 83 for yieldingly biasing the diaphragm 76 to a normal position engaging a central boss 88 formed on the contact face of the cover plate 35. Formed in the cover plate 35 in surrounding relation to the boss 88 is an annular chamber 89 that is connected through a passage 90 and the branch passage 91 to the volume chamber 38.

The chamber 83 is connected by a passage 92 to the port to which the pilot valve pipe 29 is connected. The passage 92 is also connected to the passage 36a at a point adjacent the connection with the pipe 36. A choke-fitting 93 that is screwed into a threaded portion of the passage 92 in the pipe bracket casing section 30 before assembly of the casing sections has a restricted orifice for restricting the rate of flow of fluid under pressure from the pipe 36 and passage 36a to the chamber 83 and to the pilot valve pipe 29.

The annular chamber 89 and the connected volume chamber 38 are charged with fluid under pressure from the chamber 83 past a one-way or check valve 94, shown as of the disc type. The check valve 94 comprises a disc body of rubber composition having a metallic spider plate 95 embedded therein which has a plurality of radially extending guide prongs that engage the wall of a bore 96 formed in the casing section 32. A coil spring 97 interposed between the cover plate 34 and the plate 95 of the valve urges the valve normally into seated relation on an annular rib seat 98 surrounding a port 99 opening out of the chamber 83 into the bore 96. The passage 90 from the annular chamber 89 opens into the bore 96.

It will thus be seen that when sufficient pressure is developed in the chamber 83 to overcome the relatively light force of the spring 97, check valve 94 is unseated and fluid under pressure is supplied to charge the annular chamber 89 and the connected volume chamber 38, the valve 94 seating automatically to prevent reverse flow of fluid under pressure back to chamber 83. A second check valve 99, identical in construction to the check valve 94, is provided for the purpose of enabling the release of fluid under pressure from the annular chamber 89 and the connected volume chamber 38 simultaneously with the reduction of the fluid pressure in the chamber 50. The metallic spider plate 100 of the valve 99 is guided in a bore 101 formed in the casing section 32, and a coil spring 102 interposed between the inner face of the cover plate 34 and the plate 100 of the valve 99 yieldingly biases the valve into normally seated relation on an annular rib seat 103 surrounding a port and passage 104 which opens into the passage 90.

The bore 101 communicates with the passage 82 through a passage 105, a port 106 containing a choke-fitting 107 therein, and a branch passage 108 of the passage 82. The choke-fitting 107 is secured in the port 106 as by a screw-threaded connection and is installed and removed therein as through a port 109 opening at the face of the pipe bracket casing section 30 in coaxial alignment with the port 106. The port 109 is sealed closed by the gasket between the casing sections 30 and 32 upon assembly of the casing sections.

*Operation*

A further understanding of the character of my invention may be had by assuming an application of the brakes to be effected and the occurrence of a wheel slip condition during the application of the brakes. Let it be assumed, therefore, that the engineer or operator of the train causes an application of the brakes to be effected while the train is in motion, having first cut off the propulsion power if the power is on. Upon the establishment of a fluid pressure in the control pipe 11 in response to operation of the brake valve handle 13a, an application of the brakes is effected in response to the supply of fluid under pressure from the control pipe to the brake cylinder 18 by way of the pipe 36 passages 36a and 49, chamber 48, ports 52, chamber 53, passage 37a and pipe 37.

The orifice of the choke-fitting 51 is of such size as to permit a sufficiently rapid flow of fluid under pressure through the choke-fitting and the remainder of the passage 36a to the chamber 50 above the annular piston 41 that an insufficient differential of fluid under pressure is built-up on the piston 41 to overcome the downwardly exerted force of the coil spring 45. Accordingly, the piston valve 42 remains seated on the seat bushing 46 and the supply of fluid under pressure to the brake cylinder is effected as just previously described. It will be understood that the fluid pressure established in the brake cylinder 18 corresponds to that established in the control pipe 11. It will be also understood that in a relatively short interval of time the fluid pressure in the chamber 50 equalizes with that in the chamber 48 beneath the piston 41 and, consequently, the spring 45 remains effective to hold the piston valve 42 firmly on its seat to prevent upward movement of the differential piston valve device 44 during the application of the brakes except under circumstances hereinafter to be described.

Charging of the chambers 83 and 89 on opposite sides of the diaphragm 76 as well as the volume chamber 38 connected with chamber 89 is effected as previously described by flow of fluid under pressure from the passage 36a through the orifice of the choke-fitting 93 whenever a brake application is effected. At the same time, the passage 82 and the bore 80 at the back of the poppet valve 75 are charged with fluid under pressure from passage 36a.

Unless the pressure in the pilot valve pipe 29 reduces in the manner hereinafter explained, the spring 87 holds the diaphragm 76 in its right-hand position engaging the boss 88 on the cover plate 35, thereby enabling the spring 78 to maintain poppet valve 75 firmly seated under normal conditions.

Now let it be assumed further that when the application of the brakes is effected as just described, the braking forces exerted are such as to cause slipping of the wheels of one or more pairs of wheels.

The corresponding pilot valve device or devices 24 are accordingly unseated to cause a reduction of the fluid pressure in the pilot valve pipe 29 and a corresponding reduction of the pressure in the chamber 83.

Upon a sufficient reduction of the pressure in chamber 83, such as eight pounds per square inch, the differential fluid pressure force exerted on the diaphragm 76 by the pressure of the fluid in the chamber 89 and the connected volume chamber 38 becomes effective to overcome the spring 87 and to compress it an amount sufficient to effect the engagement of the follower 86 with the end of the boss 84, which amount of movement of the diaphragm is such as to cause unseating of the valve 75.

Due to the reduction of eight pounds per square inch in the pilot valve pipe pressure required to effect initial unseating of the valve 75, the unseating of the valve 75 is effective to cause a sudden and rapid reduction of the pressure in the control chamber 50 at the upper side of the annular piston 41 of the piston valve device 44 by reason of the exhaust of fluid under pressure from the chamber 50 by way of the passage 36a, branch passage 82, bore 80, past the unseated valve 75, chamber 83, passage 92, pilot valve pipe 29 and thence through the pipes 28, 27, 26 and 25 in succession to atmosphere past the unseated pilot valve or valves 24.

It will be seen that notwithstanding the fact that the volume of the pipes 29, 28, 27, 26 and 25 may be appreciable, the initial reduction of the pressure required to effect the unseating of the valve 75 positively insures the snap movement of the piston valve device 44 to its upper position in which the piston 41 engages the inner contact face of the cap section 33 by reason of the differential fluid pressure force created on piston 41 as a result of restriction offered by choke fitting 51 to flow of fluid under pressure to chamber 50 from passage 36a.

The spring 58 acting on the piston follower 57 and resisting the unseating of the reduction control valve 54 is of such character that when the pressure of the fluid in the brake cylinder 18 active through the passage 53a on the inner seated area of the valve 54 exceeds a relatively low value, of the order of eighteen pounds per square inch, the spring 58 is overcome and the follower 57 is shifted upwardly so as to permit the spring 56 to unseat the valve 54. Once the valve 54 is unseated, the brake cylinder pressure active on the diaphragm 59 in chamber 74 maintains the follower spring 58 compressed so that valve 54 thus remains unseated thereafter except as hereinafter described.

Assuming that the pressure established in the brake cylinder in response to the application of the brakes by the engineer may be of the order of forty or fifty pounds per square inch, it will be seen that the valve 54 will be maintained in its unseated position at the time that the differential piston valve device 44 is actuated to its upper position to unseat the poppet valve 67. The unseating of the poppet valve 67 by the piston valve device 44 establishes a communication through which fluid under pressure in the piston chamber 50 is vented to atmosphere past the valve 67, through the passage 73, past the unseated valve 54, through the passage 53a, chamber 53, ports 52, to atmosphere through the exhaust port 47 at the same time that fluid under pressure is being vented to atmosphere from the brake cylinder 18 by way of the brake cylinder pipe 37, passage 37a, chamber 53, ports 52, and the exhaust port 47.

Due to the prompt and rapid reduction of the pressure in the brake cylinder 18 effected by operation of the piston valve device 44 to its upper position and the consequent prompt and rapid reduction in the degree of application of the brakes active on the slipping wheels or wheel units, those wheels promptly cease to decelerate at the abnormal or slipping rate and begin to accelerate at an abnormally rapid rate, of the order of the abnormal slipping rate during deceleration, back toward a speed corresponding to a train speed.

Due to the change in the rotative condition of the slipping wheels from deceleration to acceleration, the corresponding "Decelostat" pilot valve devices 24 are maintained operative to continue the reduction of the pressure in the pilot valve pipe 29 until the acceleration of the slipping wheels back toward a speed corresponding to train speed reduces sufficiently below the critical abnormal rate so as to effect the restoration of the pilot valve devices to closed position, which occurs slightly before the wheels actually reach a speed corresponding to train speed.

So long as one or more of the pilot valve devices 24 remain effective to continue the reduction of the pressure in the pilot valve pipe 29, a sufficient differential force will be maintained effective on the diaphragm 76 to hold the valve 75 unseated. This is so for the reason that the orifice in the choke-fitting 107 so restricts the rate of exhaust of fluid under pressure of the annular chamber 89 and the connected volume chamber 38 past the valve 75, along with the fluid under pressure vented from the chamber 50, with respect to the rate of reduction of the pressure in the chamber 83 which reduces in accordance with the rate of reduction of the pressure in the pilot valve pipe 29, that the fluid pressure in the chamber 89 and connected volume chamber 38 continues to exceed that in chamber 83 by at least eight pounds per square inch. Thus sufficient differential fluid pressure force continues active on diaphragm 76 to overcome spring 87 and maintain the valve 75 unseated.

When all of the pilot valve devices 24 are reseated and reduction of the pressure in the pilot valve pipe 29 is thus terminated, the valve 75 is promptly restored to its seated position thereby simultaneously terminating the reduction of the pressure in the chamber 50. It will be seen that this is so because once the reduction of the pressure in the pilot valve pipe 29 terminates, the pressure of the fluid in the chamber 83 is promptly and rapidly built-up through the orifice of the choke 93 from the passage 36a and the pipe 36 at the same time that the fluid pressure in the annular chamber 89 and the connected volume chamber 38 is equalizing through the orifice of the choke-fitting 107 with the pressure at the back of check valve 99 corresponding to the pressure in the passage 82. Thus, whenever the reduction of the pressure in the pilot valve pipe 29 is terminated, the fluid pressure in the chambers 83 and 89 on opposite sides of the diaphragm 76 are rapidly equalized and the spring 87 thus becomes effective to shift the diaphragm 76 in the right-hand direction into engagement with the boss 88 on the cover plate 35, thereby causing the valve 75 to be instantly reseated by the spring 78.

The reseating of the poppet valve 75 is not effective to cause the restoration of the piston valve device 44 to its lower position until the reduction control valve 54 becomes seated in response to the reduction of the pressure in the brake cylinder to below a certain low value, such as eighteen pounds per square inch. This reduction of brake cylinder pressure active on the lower face of the diaphragm 59 may occur before or after the seating of the valve 75 but it will ordinarily occur after the seating of the valve 75 due to the fact that the slipping wheels will be restored fully to a speed corresponding to train speed before the pressure in the brake cylinders will have reduced sufficiently to permit the reseating of the valve 54 by the spring biased follower 57.

With both the valves 75 and 54 reseated, however, the pressure of the fluid in the chamber 50 at the upper side of the piston 41 rapidly builds up through the orifice of the choke-fitting 51, thereby rendering the spring 45 promptly effective to shift piston valve device 44 downwardly to its lower position in which the piston valve 42 is reseated on the seat bushing 46 to terminate further reduction of the pressure in the brake cylinder and to restore the supply communication from the supply pipe 36 to the brake cylinder pipe 37 to again cause a building-up of the pressure in the brake cylinder to that established in the control pipe 11.

There is a slight operating lag between the instant that the reduction control valve 54 is reseated and the instant that the piston valve 42 is reseated. Consequently, the pressure in the brake cylinder reduces to a lower value, of the order of five pounds per square inch, before reduction of the pressure is actually terminated and the resupply of fluid under pressure to the brake cylinder initiated.

When the piston valve device 44 is restored downwardly to its lower position as just described, spring 72 restores the poppet valve 67 to its seated position in opposition to the pressure of the fluid in the chamber 50. At the same time, the resupply of fluid under pressure to the brake cylinder 18 will cause fluid at a corresponding pressure to be active on the inner seated area of the reduction control valve 54. When the pressure in the brake cylinder again exceeds a value sufficient to overcome the force of the spring 58 biasing the follower 57 downwardly, the valve 54 will be unseated and brake cylinder pressure will again be active in the chamber 74 on the lower face of the diaphragm 59 to maintain the follower 57 in its raised position. Brake cylinder pressure will accordingly be supplied past the valve 54 and through the passage 73 to the bore 69 at the back of the valve 67 to assist the spring 72 in maintaining the valve 67 seated.

Should the reapplication of the brakes in the manner just described be effective to cause a repeated occurrence of the wheel slip condition, the vent valve mechanism 22 will be operated repeatedly in the manner previously described to successively reduce the pressure in the brake cylinder to a low value, such as five pounds per square inch, and then restore it back to a value corresponding to that in the control pipe 11.

In order to explain in further detail the advantage and the utility of the vent valve mechanism 22 in the event that breakage or rupture of the pilot valve pipe 29 or any of the pipes 28, 27, 26 and 25 connected thereto occurs, let it be assumed that the flexible pipe 25 associated with the left-hand wheel-unit of truck 20 is ruptured while the train is proceeding under power with the brakes released. Rupture of the pipe 25 under such circumstances will have no immediate effect insofar as the character of the operation of the vent valve mechanism 22 is concerned for the reason that no fluid under pressure exists in the vent valve mechanism 22 or in the pilot valve pipe 29 therefor and the connected pipes.

Upon the first application of the brakes following the rupture of the pipe 25, fluid under pressure will be supplied from the control pipe 11 through the pipes 36 and 37 to the brake cylinder 18 as before described, thereby causing application of the brakes on the wheels of the trucks 20 and 21 in the usual manner. However, due to the fact that the rupture of the pipe 25 prevents the build-up of pressure in the chambers 83 and 89 of the vent valve mechanism 22, the poppet valve 75 remains seated and cannot be unseated thereafter in response to the actual occurrence of a wheel slip condition because of inability to create any fluid pressure differential on the operating diaphragm 76 of valve 75.

It will be apparent, therefore, that notwithstanding the rupture of the pipe 25 or any of the other pipes connected to the pilot valve pipe 29, a subsequently initiated application of the brakes is positively insured and cannot be prevented.

It is possible that a rupture of the pilot valve pipe 29 or any of the connected pipes, such as one of the pipes 25, may occur during an application of the brakes while the train is coming to a stop. If this occurs, the vent valve mechanism 22 will be operated in the same manner previously described in connection with response thereof to the operation of one of the "Decelostat" pilot valve devices 24. That is, the valve 75 will be unseated when a sufficient differential fluid pressure is created on the diaphragm 76 by the reduction of the pressure in the pilot valve pipe 29 caused by the breakage of the pipe 25.

The piston valve device 44 of the vent valve mechanism will accordingly be operated to its upper position and reduction of the pressure in the brake cylinder 18 to the low value of five pounds per square inch effected.

Notwithstanding the reseating of the reduction control valve 54 the piston valve device 44 will not be restored downwardly to its lower position terminating the reduction of the pressure in the brake cylinder unless the valve 75 is seated, by reason of the fact that if the valve 75 is unseated the pressure supplied to the chamber 50 from the pipe 36 and passage 36a through the orifice of the choke-fitting 51 escapes past the valve 75 to the chamber 83 and thence to atmosphere through the disrupted or broken pilot valve pipe 29.

However it must be remembered that the pressure of the fluid in the chamber 89 and the connected volume chamber 38 continues to reduce by flow past the check valve 99, through the orifice of the choke-fitting 107, and past the valve 75 while the valve is unseated. It follows, therefore, that due to the relatively small volume of the chambers 89 and 38 the fluid pressures therein will, in any event, promptly reduce to such a value with respect to the reducing pressure in chamber 83 that the differential fluid pressure force on diaphragm 76 becomes insufficient to overcome the spring 87. Spring 87 will therefore act to shift the diaphragm 88 in the right-hand direction so as to cause reseating of the valve 75, notwithstanding the fact that the pressure of the fluid in the chamber 83 does not build-up due to the escape of fluid under pressure, supplied thereto through the choke-fitting 93, by way of the ruptured pilot valve pipe 29.

Upon the seating of the poppet valve 75, therefore, pressure in the chamber 50 of the vent valve mechanism 22 will thus be promptly built-up by flow of fluid under pressure from the pipe 36 and passage 36a through the orifice of the choke-fitting 51; and the piston valve device 44 will thus be restored downwardly to its lower position in which the piston valve 42 closes the exhaust communication through the port 47 for the brake cylinder 18. If the reseating of the valve 75 is sufficiently delayed under the circumstances described, the fluid pressure in the brake cylinder 18 may actually reduce to atmospheric pressure due to the delay in restoring the piston valve device 44 to its lower position.

In any event, however, with the piston valve device 44 again in its lower position, the communication through which fluid under pressure is supplied from the control pipe 11 to the brake cylinder 18 is again established and the pressure is again built-up in the brake cylinder to a value corresponding to that in the control pipe.

Following the restoration of the piston valve device 44 to its normal lower position, the continued rupture of the pilot valve pipe 29 prevents the charging of the chambers 83, 89 and 38 of the vent valve mechanism. Consequently, a subsequent occurrence of a wheel slip condition will be ineffective to cause unseating of the valve 75 because of inability to produce a differential fluid pressure on the operating diaphragm 76 of valve 75. Thus it will be seen that if rupture of the pilot valve pipe 29 occurs during a brake application, the vent valve mechanism 22 is automatically operated to reduce the degree of application of the brakes to a low degree and then effect reapplication of the brakes, protection against the occurrence of a wheel slip condition occurring subsequently being at the same time lost. There is, in any event, a positive assurance of reapplication of the brakes notwithstanding a momentary reduction in the degree of application of the brakes on the car having a ruptured pilot valve pipe.

Accordingly, whether the rupture of the pilot valve pipe 29 or any of the connected pipes occurs while the brakes are released or during an application of the brakes, application of the brakes is in any event positively assured.

It will be further seen that the arrangement is such that a train may proceed, without stopping for immediate repair of a ruptured pilot valve pipe, until a place is reached at which the repairs may be conveniently made. This is so for the reason that when the brakes are released, fluid under pressure charging the various passages and chambers in the vent valve mechanism is reduced substantially to atmospheric pressure by reverse flow through the pipe 37 to the control pipe 11 and thence to atmosphere through the exhaust port and pipe 16 at the brake valve 13. Consequently while the brakes are released, no fluid under pressure will escape through the ruptured pilot valve pipe 29 or any of the connected pipes. Moreover, since an application of the brakes is of relatively short duration, the escape of fluid under pressure through the ruptured pilot valve pipe at the rate determined by the orifice in the choke-fitting 93 is insufficient to prevent the pressure-maintaining feature of the brake valve 13 from maintaining a pressure in the control pipe 11 corresponding to the position of the brake valve handle. Thus, rupture of a "Decelostat" pilot valve pipe 29 on any of the cars does not interfere with the proper application of the brakes on any of the other cars of the train.

When the train comes to a stop in response to an application of the brakes, fluid under pressure continues to be maintained in all of the brake cylinders until such time as the engineer of the train releases the brakes prior to again starting the train. To effect the release of the brakes, the engineer merely operates the control apparatus, exemplified by the brake valve 13, to effect reduction of the pressure in the control pipe 11 to atmospheric pressure, fluid under pressure in the brake cylinder 18 flowing reversely through the pipe 37, vent valve mechanism 22, pipe 36, and control pipe 11 to atmosphere through the exhaust port and pipe 16 at the brake valve.

Under certain circumstances, as for example where each wheel truck is provided with an individual brake cylinder and a vent valve mechanism, corresponding to the vent valve mechanism 22, is provided for each brake cylinder, it may be considered unnecessary to provide the operation-insuring and broken pipe protective features of the vent valve mechanism 22 in connection with the vent valve mechanisms employed. According to my invention, therefore, it is possible to employ a vent valve mechanism identical to the vent valve mechanism 22 except that an adapter plate 110 is secured to the face of the pipe bracket casing section 30 in place of the casing section 32, as shown in Figure 3, with a suitable sealing gasket interposed between the contact faces of the casing section 30 and the adapter plate 110.

The adapter plate 110 has a cavity or passage 111 formed therein which connects the passages 92 and 109 in the pipe bracket casing section 30. At the same time, the sealing gasket between the contact faces of the pipe bracket casing section 30 and the adapter plate 110 seals the end openings of the passages 105, 91 and 82 in the pipe bracket casing section 30.

In such case, it will be seen that when fluid under pressure is supplied to the passage 36a through the pipe 36 in response to the charging of the control pipe 11, fluid under pressure will flow on to the brake cylinder 18, in the same manner and by the same path as previously described to effect application of the brakes. Fluid under pressure will be supplied simultaneously to the chamber 50 above the annular piston 41 of the piston valve device 44 from passage 36a through the orifice of the choke-fitting 93, passages 92, 111, 109, 108 and 82, at the same time that fluid under pressure is being supplied directly through the orifice of the choke-fitting 51, thereby preventing the creation of a sufficient differential fluid pressure on piston valve device 44 to cause operation of the piston valve device out of the normal or lower position thereof.

Whenever a reduction of the fluid pressure in the pilot valve pipe 29 occurs in response to either the operation of the "Decelostat" pilot valve devices 24 or rupture of the pilot valve pipe 29 and any of its connected pipes, fluid under pressure is vented from the chamber 50 at a rapid rate by way of the passages 36a, 82, 108, 109, 111, 92 and the pilot valve pipe 29, thereby effecting operation of the piston valve device 44 to its upper position.

The rate of flow of fluid under pressure through the parallel-related choke fittings 51 and 93 to chamber 50 is ordinarily such that a sufficiently rapid reduction of the pressure in chamber 50 will be effected in response to venting of the pilot valve pipe 29 by the "Decelostat" pilot valve devices 24, to cause shifting of the piston valve device 44 from its normal down position to its upper position. In some instances it may, however, be desirable to substitute chokes having smaller orifices than those of chokes 51 or 93 or a screw plug may be substituted for one of the chokes 51 or 93.

The character of the operation of the vent valve mechanism having the adapter plate 110 with respect to controlling the supply and the release of fluid under pressure from the brake cylinder is thus similar to that previously described in connection with the vent valve mechanism 22 except that the functions of the auxiliary valve mechanism embodied in casing section 32 are omitted. Further description is accordingly deemed unnecessary.

The advantage of this feature of my invention lies in the fact that the pipe bracket casing section 30, the vent valve casing section 31 and the cap section 33 of a vent valve mechanism may be standardized by a manufacturer regardless of the particular situation for which the vent valve mechanism is required, the purchaser having the option of employing the auxiliary casing section 32 or the adapter plate 110, depending upon the particular control characteristics he desires.

Having now described my invention, what I claim as new and desire to secure by Letters Patent is:

1. Control apparatus comprising the combination of means providing a chamber chargeable with fluid under pressure, a valve device normally conditioned to establish a communication through which fluid under pressure may be supplied to a fluid pressure receiving device and operative in response to a rapid rate of reduction of the pressure in said chamber, to a different position in which the said supply communication is closed and an exhaust communication is established through which fluid under pressure is vented from the fluid pressure receiving device, a piloting communication chargeable with fluid under pressure and adapted to have the pressure therein reduced, normally closed valve means cutting off communication between the said chamber and said piloting communication, and fluid pressure responsive means operative only in response to a reduction of the pressure in the said piloting communication of more than a certain amount for opening the said valve means and thereby causing a rapid reduction of the pressure in the chamber incidental to the reduction of the pressure in said piloting communication.

2. Control apparatus comprising, in combination, valve mechanism normally positioned to establish a communication through which fluid under pressure may be supplied to a fluid pressure receiving device, means providing a chamber adapted to be charged with fluid under pressure upon the supply of fluid under pressure to said fluid pressure receiving device, said valve mechanism being operative, in response to a rapid reduction of the pressure in the said chamber, out of its normal position to a different position in which the supply of fluid under pressure to the fluid pressure receiving device is cut off and fluid under pressure is vented from the fluid pressure receiving device, a piloting communication chargeable with fluid under pressure upon the supply of fluid under pressure to the flu'd pressure receiving device, a normally closed valve effective when opened to connect said chamber to said piloting communication, and fluid pressure operated means responsive to a reduction of the pressure in the piloting communication of more than a certain amount for effecting opening of said valve and the consequent rapid reduction of the pressure in said chamber incidental to the reduction of the pressure in the said piloting communication.

3. Control apparatus comprising, in combination, valve mechanism normally positioned to establish a communication through which fluid under pressure may be supplied to a fluid pressure receiving device, means providing a chamber adapted to be charged with fluid under pressure upon the supply of fluid under pressure to said fluid pressure receiving device, said valve mechanism being operative, in response to a rapid reduction of the pressure in the said chamber, out of its normal position to a different position in which the supply of fluid under pressure to the fluid pressure receiving device is cut off and fluid under pressure is vented from the fluid pressure receiving device, a piloting communication chargeable with fluid under pressure upon the supply of fluid under pressure to the fluid pressure receiving device, a normally closed valve effective when opened to connect said chamber to said piloting communication, fluid pressure responsive means subject on one side to the fluid pressure in said piloting communication and on the opposite side to the pressure of fluid in a chamber, means for charging the last said chamber with fluid at a pressure corresponding to the pressure in the piloting communication, and means effective upon a rapid reduction of the pressure in the piloting communication to cause reduction of the pressure in the last said chamber at a lesser rate, whereby to cause at least a certain fluid pressure differential force to become active on the fluid pressure responsive means effective to cause opening of said valve and to maintain said valve open so long as said certain fluid pressure differential force remains active on the fluid pressure responsive means.

4. Apparatus for controlling the application of brakes to a wheel of a vehicle comprising the combination of a valve mechanism normally in a position establishing a communication through which fluid under pressure may be supplied to effect application of the brakes on the wheel and operative, in response to a rapid reduction of a control fluid pressure, to a different position in which the communication through which fluid under pressure may be supplied to effect application of the brakes is cut off and a different communication is established through which fluid under pressure is released to effect a reduction in the degree of application of the brakes associated with said wheel, wheel slip detecting means operatively responsive to the occurrence of a slipping condition of the wheel due to a brake application, a piloting communication connecting the wheel slip detecting means and the said valve mechanism, said piloting communication being charged with fluid under pressure when fluid under pressure is supplied to effect application of the brakes, and valve means operatively responsive to a reduction of the pressure in the piloting communication effected by operation of the wheel slip detecting means of more than a certain amount for effecting a reduction of the control fluid pressure for the valve mechanism at a rapid rate so long as the reduction of the pressure in the piloting communication continues.

5. Control apparatus for a vehicle of the type having a brake cylinder to which fluid under pressure is supplied to effect application of the brakes on a wheel of the vehicle and from which fluid under pressure is vented to effect release of the brakes, comprising the combination of a valve mechanism normally in a position establishing a communication through which fluid under pressure may be supplied to the brake cylinder and having a control chamber chargeable with fluid under pressure, said valve mechanism being operative, in response to a rapid reduction of the pressure in the control chamber, to a different position cutting off the communication through which fluid under pressure is supplied to the brake cylinder and establishing an exhaust communication through which fluid under pressure is vented from the brake cylinder, a piloting communication chargeable with fluid under pressure, valve means operative upon the occurrence of a slipping condition of the vehicle wheel due to braking to effect a rapid reduction of the pressure in said piloting communication, and a fluid pressure operated valve device responsive only to a reduction of the pressure in the piloting communication of more than a certain amount to connect the control chamber of the valve mechanism to the piloting communication whereby to cause rapid reduction of the pressure therein in accordance with the reduction of the pressure in the piloting communication.

6. Control apparatus for a vehicle of the type having a brake cylinder to which fluid under pressure is supplied to effect application of the brakes on a wheel of the vehicle and from which fluid under pressure is released to effect release of the brakes, comprising the combination of a valve mechanism normally in a position establishing communication through which fluid under pressure may be supplied to the brake cylinder, said valve mechanism having a control chamber chargeable wtih fluid under pressure upon the supply of fluid under pressure to the brake cylinder and being operative, in response to a rapid reduction of the pressure in the control chamber, to a different position in which the supply communication is cut off and an exhaust communication is established through which fluid under pressure is released from the brake cylinder, a piloting communication chargeable with fluid under pressure when fluid under pressure is supplied to the brake cylinder, valve means operative to effect a rapid reduction of the pressure in the piloting communication whenever a slipping condition of the wheel occurs due to braking, and fluid pressure operated valve means operatively responsive to a reduction of the pressure in the piloting communication of more than a certain amount for establishing a communication through which the pressure of the fluid in the control chamber of the said valve mechanism is reduced at a rapid rate by way of the piloting communication.

7. Control apparatus for a vehicle of the type having a brake cylinder to which fluid under pressure is supplied to effect application of the brakes on a wheel of the vehicle and from which fluid under pressure is released to effect release of the brakes, comprising the combination of a valve mechanism normally in a position establishing a communication through which fluid under pressure may be supplied to the brake cylinder, said valve mechanism having a control chamber chargeable with fluid under pressure upon the supply of fluid under pressure to the brake cylinder and being operative, in response to a rapid reduction of the pressure in the control chamber, to a different position in which the supply communication is cut off and an exhaust communication is established through which fluid under pressure is released from the brake cylinder, a piloting communication chargeable with fluid under pressure when fluid under pressure is supplied to the brake cylinder, valve means operative to effect a rapid reduction of the pressure in the piloting communication whenever a slipping condition of the wheel occurs due to braking, fluid pressure operated valve means operatively responsive to a reduction of the pressure in the piloting communication of more than a certain amount for establishing a communication through which the pressure of the fluid in the control chamber of the said valve mechanism is reduced at a rapid rate by way of the piloting communication, and means effective after the valve mechanism has been operated to its said different position for continuing the reduction of the pressure in the control chamber in accordance with the rate of reduction of the pressure in the brake cylinder until the pressure in the brake cylinder reduces below a certain value, said valve mechanism being restored to its normal position in response to the charging of said control chamber following the reduction of the pressure in the brake cylinder to below said certain value and following operation of said fluid pressure operated valve means to cut off the communication between the control chamber and the piloting communication when reduction of the pressure in the piloting communication ceases.

8. Control apparatus for a vehicle of the type having a brake cylinder to which fluid under pressure is supplied to effect application of the brakes associated with a wheel of the vehicle and from which fluid under pressure is vented to effect release of the brakes, comprising the combination of a valve mechanism normally in a position establishing a communication through which fluid under pressure may be supplied to the brake cylinder, a control chamber chargeable with fluid under pressure upon the supply of fluid under pressure to the brake cylinder, said valve mechanism being operative, in response to a rapid reduction of the pressure in the control chamber, to a different position in which it cuts off the supply communication and establishes an exhaust communication through which fluid under pressure is rapidly vented from the brake cylinder, a piloting communication chargeable with fluid under pressure when fluid under pressure is supplied to the brake cylinder, valve means operative in response to the occurrence of a slipping condition of the wheel due to braking for effecting the rapid reduction of the pressure in the said piloting communication, and fluid pressure operated valve means controlling communication between the control chamber and the piloting communication, said fluid pressure operated valve means being responsive only to a reduction of the pressure of the piloting communication of more than a certain amount for establishing communication between the control chamber and the piloting communication and for maintaining such communication only so long as the pressure in the piloting communication continues to reduce in response to operation of said wheel slip responsive valve means, said fluid pressure operated valve means being also operated to cut off communication between the control chamber and the piloting communication whereby to enable recharging of said control chamber and the restoration of the valve mechanism to its normal position notwithstanding rupture of said piloting communication.

9. Control apparatus for a vehicle of the type having a brake cylinder to which fluid under pressure is supplied to effect application of the brakes associated with a wheel of the vehicle and from which fluid under pressure is vented to effect release of the brakes, comprising the combination of a valve mechanism normally in a position establishing a communication through which fluid under pressure may be supplied to the brake cylinder, a control chamber chargeable with fluid under pressure upon the supply of fluid under pressure to the brake cylinder, said valve mechanism being operative, in response to a rapid reduction of the pressure in the control chamber, to a different position in which it cuts off the supply communication and establishes an exhaust communication through which fluid under pressure is rapidly vented from the brake cylinder, a piloting communication chargeable with fluid under pressure when fluid under pressure is supplied to the brake cylinder, valve means operative in response to the occurrence of a slipping condition of the wheel due to braking for effecting the rapid reduction of the pressure in the said piloting communication, a valve device normally cutting off communication between the control chamber and the piloting communication, fluid pressure responsive means subject on one side to the fluid pressure in the piloting communication and on the opposite side to the fluid pressure in a chamber, and means for effecting a reduction of the fluid pressure in the last said chamber concurrently with the reduction of the fluid pressure in the piloting communication but at a lesser rate whereby to create a fluid pressure differential force on the fluid pressure responsive means effective to operate said valve device to establish communication between the control chamber and the piloting communication so long as the fluid pressure in the piloting communication continues to reduce at a rapid rate, said fluid pressure responsive means being controlled in response to the ultimate reduction of the fluid pressure in the piloting communication, due to undesired rupture thereof, in a manner to cause operation of the said valve device to cut off communication between the control chamber and the piloting communication whereby to enable recharging of the control chamber and consequent restoration of the valve mechanism to its normal position.

10. Control apparatus comprising a valve mechanism normally in a certain position and operative to a different position in response to a certain reduction of a control fluid pressure, a piloting communication chargeable with fluid under pressure, means operative in response to a certain amount of reduction of the pressure in the piloting communication for effecting said certain reduction of the control fluid pressure, and means operative upon the undesired rupture of the piloting communication for causing restoration of the control fluid pressure and the consequent restoration of the valve mechanism from its said different position to its said normal position.

11. Control apparatus comprising a valve mechanism having a certain normal control position, a piloting communication chargeable with fluid under pressure, said valve mechanism being operative, in response to a predetermined reduction of pressure in the piloting communication, to a different control position, and means operative upon the undesired rupture of the piloting communication for causing restoration of said valve mechanism from its said different position to its said normal position.

12. Control apparatus comprising a valve mechanism normally in a position for establishing a communication through which fluid under pressure may be supplied to a fluid pressure receiving device, a piloting communication chargeable with fluid under pressure, said valve mechanism being operative in response to a rapid reduction of pressure in the piloting communication, to a different position in which the supply communication is cut off and an exhaust communication is established through which fluid under pressure is released from the fluid pressure receiving device, and means responsive to the undesired rupture of the piloting communication for positively insuring restoration of the said valve mechanism from its said different position to its said normal position.

13. Control apparatus for a vehicle of the type having a brake cylinder to which fluid under pressure is supplied to effect application of the brakes associated with a wheel of the vehicle and from which fluid under pressure may be vented to effect release of the brakes, comprising, in combination, a valve mechanism normally in a position establishing a communication through which fluid under pressure may be supplied to the brake cylinder, a piloting communication chargeable with fluid under pressure when fluid under pressure is supplied to the brake cylinder, valve means operatively responsive to the occurrence of a slipping condition of the wheel due to braking to cause reduction of the pressure in said piloting communication at a rapid rate, said valve mechanism being operated to a different position in response to the rapid reduction of the pressure in the piloting communication to cut off the supply communication to the brake cylinder and to establish an exhaust communication through which fluid under pressure is vented from the brake cylinder, and means operative in the event of undesired rupture of the piloting communication for positively insuring restoration of the valve mechanism from its different position to its normal position to thereby insure the resupply of fluid under pressure to the brake cylinder.

14. A valve unit comprising a pipe bracket casing section to which fluid pressure connections from a fluid pressure receiving device, a source of fluid pressure supply and a piloting communication are made, said pipe bracket casing section having two different contact faces, a first casing section secured to one of said contact faces, the said first casing section embodying a valve mechanism normally in a position establishing communication between the source of fluid pressure supply and the fluid pressure receiving device and operative, in response to a reduction of the pressure in the piloting communication, to a different position cutting off the communication between the source of supply and the fluid pressure receiving device and establishing an exhaust communication through which fluid under pressure is vented from the fluid pressure receiving device, and a second casing section secured to the other contact face of the pipe bracket casing section and embodying auxiliary valve mechanism, said auxiliary valve mechanism being operative in response to a certain amount of reduction of the pressure in the piloting communication to cause positive operation of the said valve mechanism embodied in the said first casing section from its normal position to its said different position and being effective in the event of undesired rupture of the piloting communication to insure restoration of the valve mechanism embodied in the said first casing section from its said different position to its said normal position.

15. Control apparatus for a vehicle of the type having a control pipe chargeable with fluid at different pressures according to a desired degree of brake application, a brake cylinder to which fluid under pressure is supplied to effect application of the brakes associated with a wheel of the vehicle and from which fluid under pressure is vented to effect release of the brakes, and a piloting pipe chargeable with fluid under pressure, said apparatus comprising in combination, a valve unit including a pipe bracket casing section having passages adapted to be connected respectively to the brake cylinder, to the control pipe and to the piloting pipe, said pipe bracket casing section having two contact faces, a first casing section secured to one of said contact faces and embodying a valve mechanism normally in a position establishing communication between the passages in the pipe bracket section connected respectively to the control pipe and the brake cylinder, and being operated as the result of a rapid reduction of fluid pressure established in the piloting pipe to a different position cutting off the connection between the control pipe and the brake cylinder passages and establishing an exhaust communication through which fluid under pressure is vented from the brake cylinder, and a second casing section secured to the other of said contact faces of the pipe bracket casing section and embodying auxiliary valve mechanism, said auxiliary valve mechanism being operative in response to the reduction of the pressure in the piloting pipe for insuring positive operation of the valve mechanism from its normal position to its said different position and being effective upon the undesired rupture of the piloting pipe to insure the restoration of the valve mechanism from its said different position to its said normal position.

16. Control apparatus comprising a valve mechanism having a certain normal control position, a piloting communication chargeable with fluid under pressure, said valve mechanism being operative following upon a predetermined reduction of pressure in the piloting communication to a different control position, and means operative upon the undesired rupture of the piloting communication for causing restoration of said valve mechanism from its said different position to its said normal position at the expiration of a certain limited time following the rupture of the piloting communication.

17. Control apparatus comprising a valve mechanism normally in a position for establishing a communication through which fluid under pressure may be supplied to a fluid pressure receiving device and having a control chamber, chargeable with fluid under pressure, a reduction of the pressure in which is effective to cause operation of the valve mechanism to a different position in which the supply communication is cut off and an exhaust communication is established through which fluid under pressure is released from the fluid pressure receiving device, a piloting communication chargeable with fluid under pressure, and an auxiliary valve device normally in a closed position and operative in response to a rapid reduction of pressure in the piloting communication to a position connecting the control chamber of the valve mechanism to the piloting communication whereby reduction of the pressure therein is effected, said auxiliary valve device being restored to its closed position at the expiration of a certain limited time whereby to close off the connection between the control chamber of the valve mechanism and the piloting communication and thereby positively insure restoration of the valve mechanism from its said different position to its said normal position in the event of undesired rupture of the piloting communication.

18. Control apparatus comprising, in combination, valve mechanism normally positioned to establish a communication through which fluid under pressure may be supplied to a fluid pressure receiving device, means providing a chamber adapted to be charged with fluid under pressure upon the supply of fluid under pressure to said fluid pressure receiving device, said valve mechanism being operative responsively to a rapid reduction of the pressure in said chamber out of its normal position to a different position in which the supply of fluid under pressure to the fluid pressure receiving device is cut off and an exhaust communication established through which fluid under pressure is vented from the fluid pressure receiving device, a piloting communication chargeable with fluid under pressure upon the supply of fluid under pressure to the fluid pressure receiving device, a normally closed valve effective when opened to connect said chamber to said piloting communication, fluid pressure responsive means subject on one side to the fluid pressure in said piloting communication and on the opposite side to the pressure of fluid in a chamber, check valve means so arranged as to enable rapid charging flow of fluid under pressure from said one side to the chamber at said opposite side of the fluid pressure responsive means while preventing back flow of fluid under pressure therepast, and means providing a restricted communication between the said one side and the chamber at said opposite side of said fluid pressure responsive means whereby reduction of the pressure in the chamber at said opposite side is effected concurrently with the reduction of the pressure on the said one side but at a lesser rate so as to create a fluid pressure differential force on the fluid pressure responsive means effective to cause opening of said valve.

JOSEPH C. McCUNE.

REFERENCES CITED

The following references are of record in the file of this patent:

UNITED STATES PATENTS

| Number | Name | Date |
|---|---|---|
| 2,160,189 | Aikman | May 30, 1939 |
| 2,258,820 | Sorensen | Oct. 14, 1941 |